US012195316B2

(12) United States Patent
McCready

(10) Patent No.: US 12,195,316 B2
(45) Date of Patent: Jan. 14, 2025

(54) MULTIFUNCTIONAL BOTTLE OPENER AND CARRYING ATTACHMENT

(71) Applicant: Michael McCready, Ossining, NY (US)

(72) Inventor: Michael McCready, Ossining, NY (US)

( * ) Notice: Subject to any disclaimer, the term of this patent is extended or adjusted under 35 U.S.C. 154(b) by 0 days.

(21) Appl. No.: 18/777,856

(22) Filed: Jul. 19, 2024

(65) Prior Publication Data

US 2024/0375927 A1 Nov. 14, 2024

(51) Int. Cl.
*B67B 7/16* (2006.01)
*A45F 5/00* (2006.01)

(52) U.S. Cl.
CPC .................. *B67B 7/16* (2013.01); *A45F 5/00* (2013.01); *A45F 2005/002* (2013.01); *A45F 2200/0583* (2013.01)

(58) Field of Classification Search
CPC .... B67B 7/00; B67B 7/02; B67B 7/04; B67B 7/06; B67B 7/12; B67B 7/14; B67B 7/16; B67B 7/18; B67B 7/30; B67B 7/40; B67B 7/44; B65D 51/243; A45F 5/00; A45F 5/021; A45F 2005/002; A45F 2200/0583; A45C 1/06; A45C 2001/062; A45C 1/08; A45C 11/182; B42F 1/06
See application file for complete search history.

(56) References Cited

U.S. PATENT DOCUMENTS

| | | | | |
|---|---|---|---|---|
| 4,745,829 A * | 5/1988 | VanHoutte | B67B 7/403 81/3.55 |
| 4,949,600 A * | 8/1990 | Tricinella | B67B 7/44 81/3.55 |
| 5,555,778 A * | 9/1996 | Otters | B67B 7/406 D8/40 |
| 2002/0157745 A1* | 10/2002 | Stodghill | A45C 1/06 150/145 |

FOREIGN PATENT DOCUMENTS

| | | | | |
|---|---|---|---|---|
| EP | 1084988 | * | 3/2001 | B67B 7/403 |

* cited by examiner

*Primary Examiner* — Robert J Scruggs
(74) *Attorney, Agent, or Firm* — Michael J. Feigin, Esq.; Feigin and Fridman LLC

(57) ABSTRACT

A multifunctional bottle opener and carrying attachment has an end that is inserted between a perimeter of a bottle cap and a bottle top, whereupon tilting the device away from the bottle, force is applied to the bottle cap, thus removing the bottle cap from the bottle top. The device further may be inserted between a band encircling a perimeter of a bottle neck and oriented such that a contiguous bend to which rope and other attachment mechanisms may connect is disposed away from the bottle. The attachment of the opener to the band encircling the perimeter of the bottle neck enables the bottle to be conveniently transported and carried.

18 Claims, 5 Drawing Sheets

MULTIFUNCTIONAL BOTTLE OPENER AND CARRYING ATTACHMENT

FIELD OF THE INVENTION

The present invention relates to a multifunctional bottle cap opener, and more specifically to a bottle opener that functions as a hook to connect a beverage bottle to a carrying device.

BACKGROUND OF THE INVENTION

Traditional bottle cap openers are designed solely for the purpose of removing caps from bottles. While effective in their primary function, traditional openers often lack additional utility, thus constituting single-purpose tools that are easily misplaced or forgotten. Furthermore, when consumers are on the go, carrying bottles, especially those containing beverages, can be cumbersome. Bottles often take up valuable space inside bags or are awkward to carry by hand, leading to potential spills or damage.

Previous attempts to address these issues have resulted in products that either focus on bottle opening or on attachment mechanisms and rarely both. For instance, some bottle openers are integrated into multi-tools, providing a range of functions at a cost of increased bulk and complexity. On the other hand, bottle carriers or attachments typically require separate components that do not include a bottle opening function.

Thus, there has been a long felt and unsolved need for a compact, easy-to-use device that simplifies the process of managing bottles during travel or outdoor activities.

SUMMARY OF THE DISCLOSED TECHNOLOGY

The present technology is a bottle opening device that not only provides a convenient mechanism to open various types of bottles but also serves as an attachment mechanism for securing bottles to bags, ropes, and other carrying devices. This dual functionality addresses the needs of consumers for both practicality and portability, especially in outdoor and travel scenarios.

The present invention has a bottle opening device with a single continuous structure featuring three midsegments, each extending linearly, and two concave bends at opposite ends. A first concave bend is disposed between the first and second midsegments, while a second concave bend is situated between the second and third midsegments. Additionally, the device includes a first angular end segment at the end of the first midsegment and a second angular segment at the end of the third midsegment. In some embodiments, the three midsegments are parallel to one another. Furthermore, a first line of tangency to a lateral midpoint of the first concave bend may be parallel to a second line of tangency to a lateral midpoint of the second concave bend. In some embodiments, the second angular segment forms a right angle with respect to the third midsegment and is parallel to the second line of tangency. For purposes of this disclosure, "concave" is defined as "facing towards and extending towards the center of a device," while "convex" is defined as "facing away from and extending away from the center of a device."

Additionally, in some embodiments, the device includes a first set of faces with the first and second faces being congruent and parallel. The bottle opening device may have a largest cross-sectional area along its height that is less than 5% larger than the smallest cross-sectional area along its height; the height is a shortest linear length spanning between the first face of the first set of faces and the second face of the first set of faces. "Spanning" is defined as "stretching between, thereby connecting two end structures."

A second set of faces may span the distance between and connect the first set of faces. The second set of faces can form right angles with the first set of faces at their connecting edges. The device, in further embodiments, features a concave curvilinear edge at the second angular segment, spanning between the first and second faces of the first set of faces. The first angular segment can further comprise a first subsegment forming an obtuse angle with the first midsegment and a second subsegment forming a right angle with the first subsegment.

Embodiments of the disclosed technology may be also be described as continuous bent wire that includes a first segment at a right angle to a second segment, the second segment ending at a first 180-degree curve, a third segment extending from this first curve to a second 180-degree curve, and a fourth segment beginning at the second 180-degree curve and ending at an obtuse angle in the wire bent towards the third segment. This wire may further include a fifth segment between the obtuse angle and a right angle bend, with a sixth segment connected to the right angle bend, the sixth segment terminating the wire. The second, third, and fourth segments may be parallel to each other, and the first and second 180-degree curves can be identical in size and flipped 180 degrees relative to each other, both facing towards the center of the contiguous bent wire. In some embodiments, the first segment terminates at the end of the wire, adjacent to the third segment, with the obtuse angle bent towards to the third segment. For purposes of this disclosure, "adjacent" is defined as "having a space therebetween which is less than half a shortest distance between any two midsegments".

In further embodiments, a method is disclosed for using the bottle opening device, comprising steps of upwardly inserting the concave curvilinear edge between a bottle top and cap, pressing downwards on at least one specific component to pry off the cap. The second angular segment may be used as a fulcrum against the bottle top. Another method of using the disclosed technology involves using the concave curvilinear edge to abut against a bottle top beneath a tamper-evident band, lowering the first concave bend into the bottle, tilting the device to secure the third midsegment with the flexible ring, and looping an attachment mechanism beneath the first concave bend to connect the device to the attachment mechanism.

Figure 1:
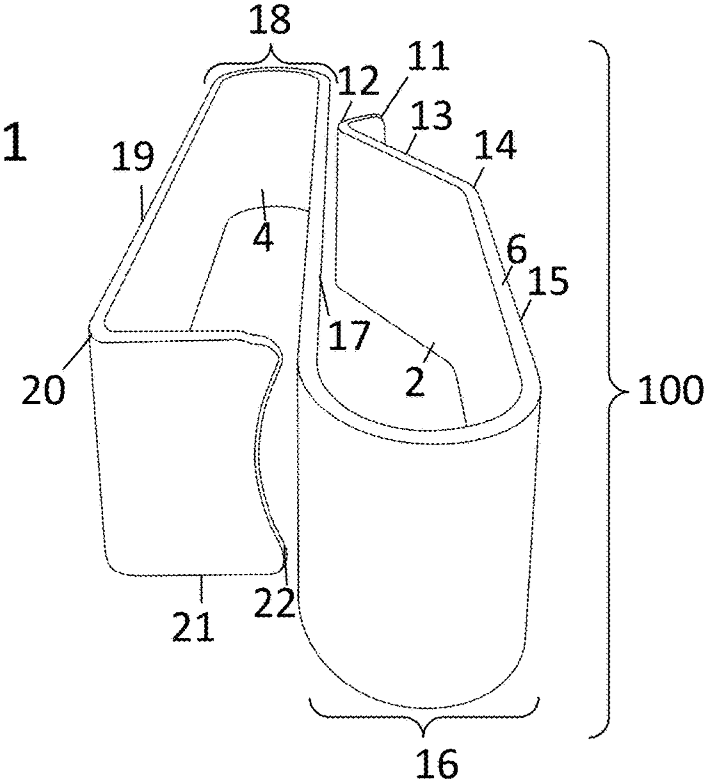
FIG. 1 is a top and front perspective view of the bottle opening device in an embodiment of the disclosed technology.

FIG. *5a* is a perspective view of the bottle opening device of FIG. 1 being placed into a bottle.

FIG. *5b* is an enlarged view of an upper portion of FIG. *5a*.

Figure 6B:
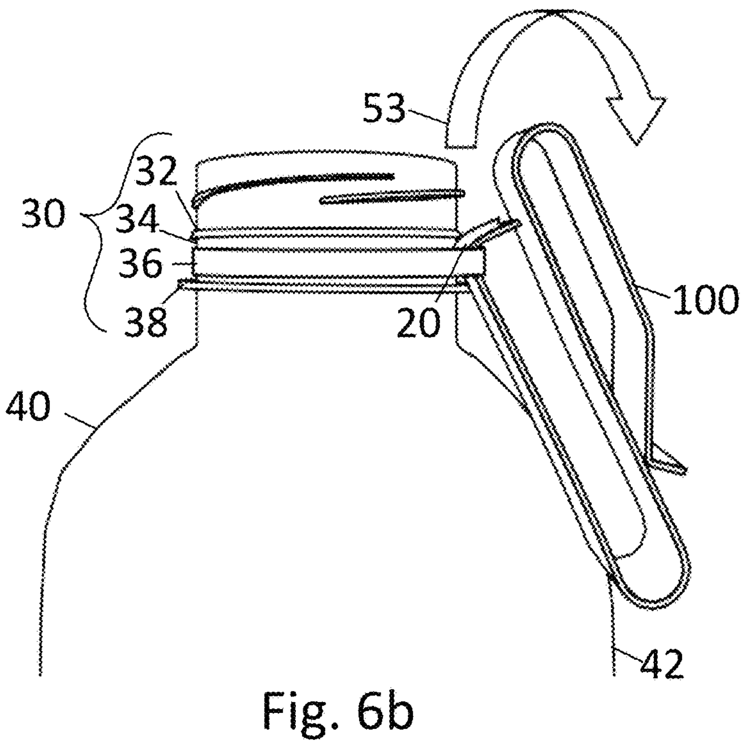
Figure 6A:
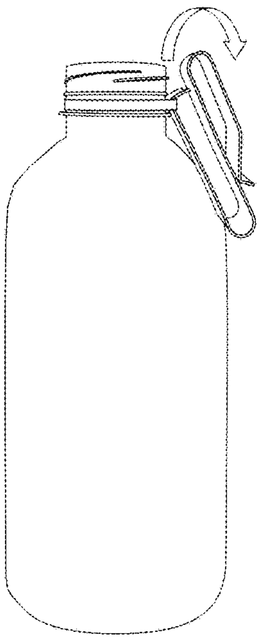

FIG. 6*a* is a perspective of the bottle opening device of FIG. 1 being slid under a tamper-evident band of a bottle.

FIG. 6*b* is an enlarged view of an upper portion of FIG. 6*a*.

Figure 7B:
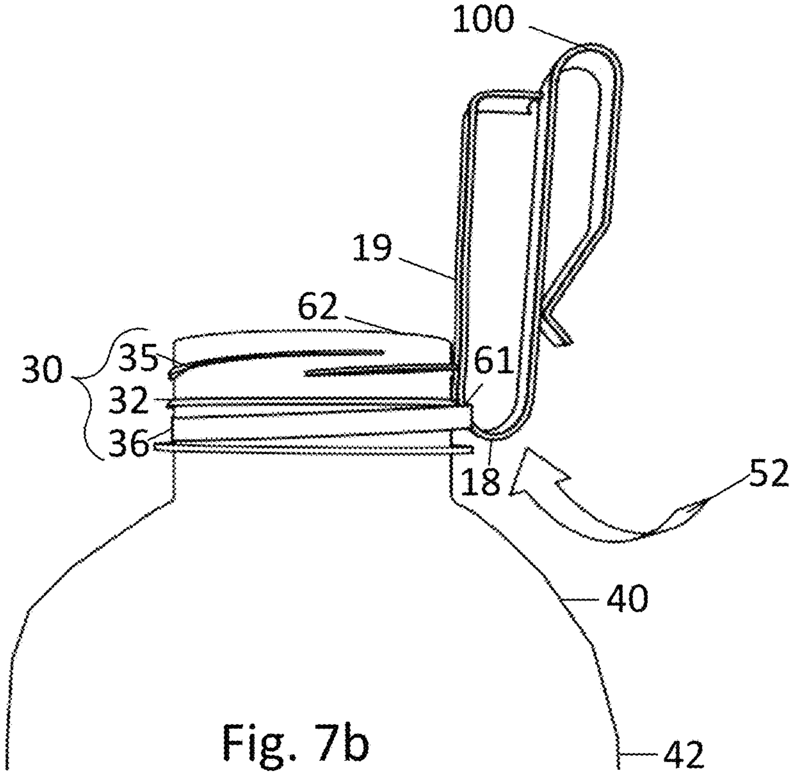
Figure 7A:
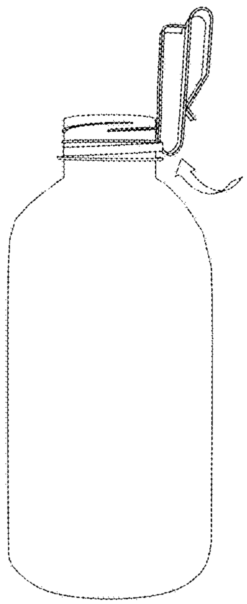

FIG. 7*a* is a perspective view of the bottle opening device of FIG. 1 secured to a water bottle.

FIG. 7*b* is an enlarged view of an upper portion of FIG. 6*a*.

Figure 8:
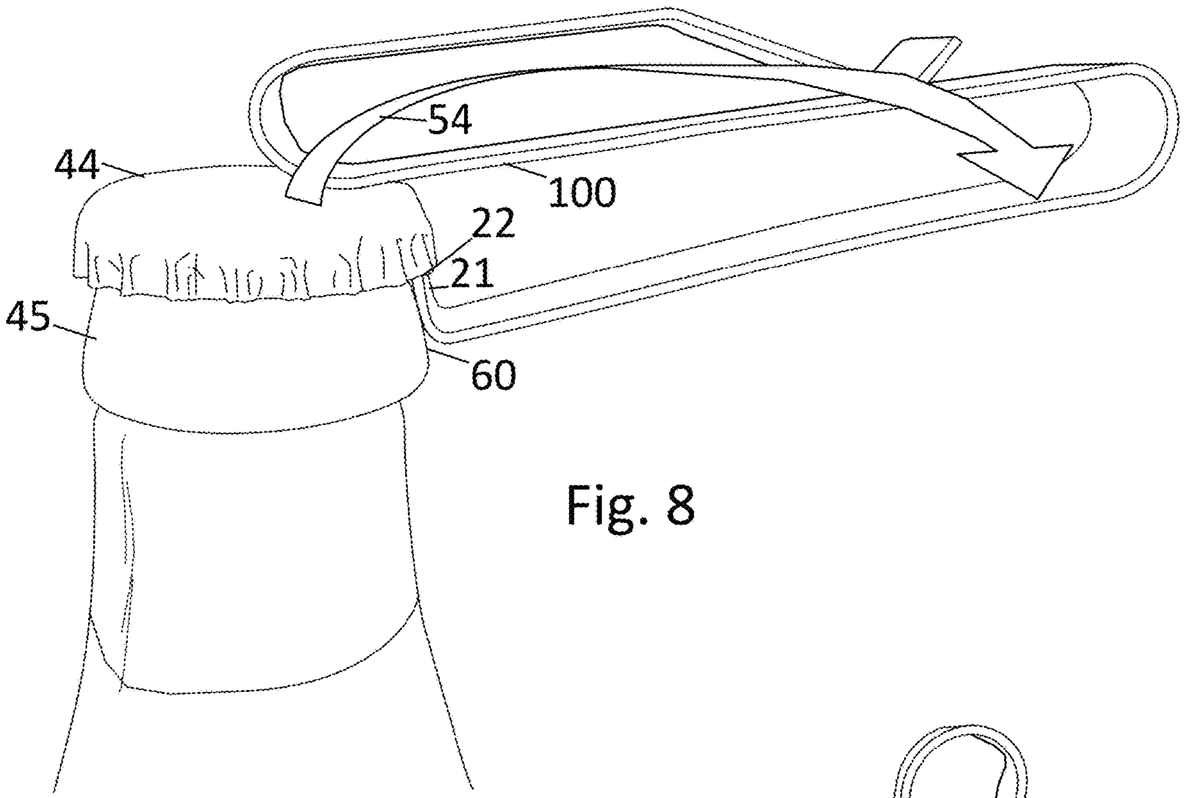

FIG. 8 is a perspective view of the bottle opening device of FIG. 1 removing a bottle cap.

Figure 9:
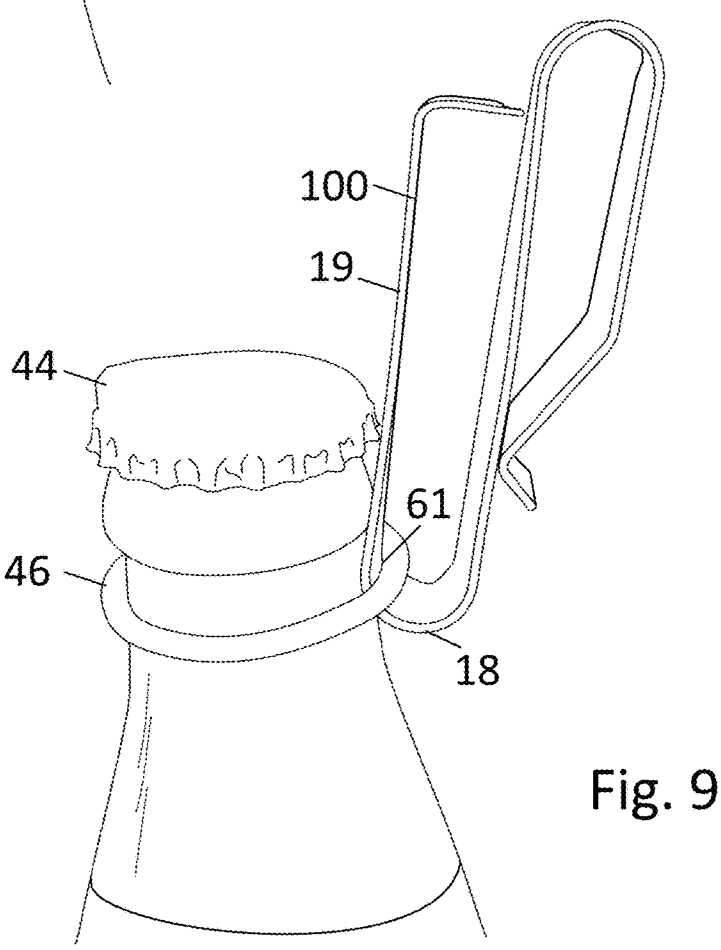

FIG. 9 is a perspective view of the bottle opening device of FIG. 1 secured to a tamper-evident band of a bottle.

DETAILED DESCRIPTION OF THE DISCLOSED TECHNOLOGY

The present technology is a bottle opening device and carrying hook for a bottle. The device has a contiguous and curvilinear shape having multiple linear midsegments and curves therebetween forming a hook device with fulcrum to remove a bottle cap, and then suspend from a tamper-evident band of the bottle.

Embodiments of the disclosed technology will become clear in light of the discussion of the drawings hereinbelow.

Turning to FIG. 1, FIG. 1 is a top and front perspective view of the bottle opening device 100 in an embodiment of the disclosed technology. For purposes of this disclosure, the side of the device 100 having bend 16 is referred to as the "top," the side having bend 18 is referred to as the "bottom," side 6 is referred to as the "front," and side 8 (see FIG. 4) is referred to as the "back" of the device 100. The appending of the term "side" to any directional or positional marker of a portion of the device should be understood to be synonymous to the directional or positional marker in isolation—e.g "front" and "front side" both refer to side 8. The front side 6 and the back side 8 are mirror images of one another. Any other directional indications are relative to the aforedescribed sides.

The bottle opening device 100 comprises a single contiguous and bent structure having a first midsegment 15, a second midsegment, 17, and a third midsegment 19, each midsegment extending linearly. In embodiments of the disclosed technology, the bottle opening device 100 is formed from a single linear length of material which is bent into the shape shown and described herein. Two oppositely disposed concave bends 16 and 18 connect to the midsegments. The first concave bend 16 is disposed between the first midsegment 15 and the second midsegment 17, while a second concave bend 18 is situated between the second midsegment 17 and the third midsegment 19. Additionally, the device includes a first angular end segment 13 at an end of the first midsegment 15 and a second angular segment 21 at the end of the third midsegment 19. A curvilinear edge 22 may constitute an end of the second angular segment 21, the utility of which will be further discussed with respect to subsequent figures.

The "angular" end segments are said to be "angular" in that such segments connect to respective midsegments at an angle other than 180 degrees, thus being non-parallel and non-collinear to the respective midsegments. In the case of the first angular end segment 13, an obtuse angle 14 is formed, in some embodiments, between the first midsegment 15 and the first angular segment 13. The first angular segment 13 may connect, at a right angle 12, to a linear end segment 11. In the case of the second angular segment 21, a right angle 20 is, in some embodiments, formed between the second angular segment 21 and the third midsegment 19.

The three midsegments 15, 17, and 19 may be parallel to one another. Furthermore, a first line of tangency to a lateral midpoint of the first concave bend 16 may be parallel to a second line of tangency to a lateral midpoint of the second concave bend 18. "Lateral" with respect to the bends is defined as "a shortest linear length spanning between the two midsegments adjoined to the bend." Described differently, the two concave bends 16 and 18 may be mirror images of one another with allowance for difference in lateral lengths of segments joining to the respective concave bends. In embodiments of the disclosed technology the concave bends 16 and 18 are identical but for an opposite orientation relative to one another. The second angular end segment 21 may be parallel to the aforementioned two lines of tangency.

The bottle opening device 100 comprises two contiguous faces 2 and 4 that are disposed on opposite faces of the device 100. The undulations and curvature of the device 100 are such that a first face 2 is disposed at an interior of the device 100 at the first midsegment 15, while disposed at an exterior of the device 100 at the third midsegment 19. The second face 4 is disposed at an exterior of the device 100 at the first midsegment 15, while disposed at an interior of the device 100 at the third midsegment 19.

The undulations and curvature of the device 100 are further such that along a majority of a longest linear length of the second midsegment 17, an intersecting line perpendicular thereto further intersects at least one of the other two midsegments 15 and 19.

Figure 2:
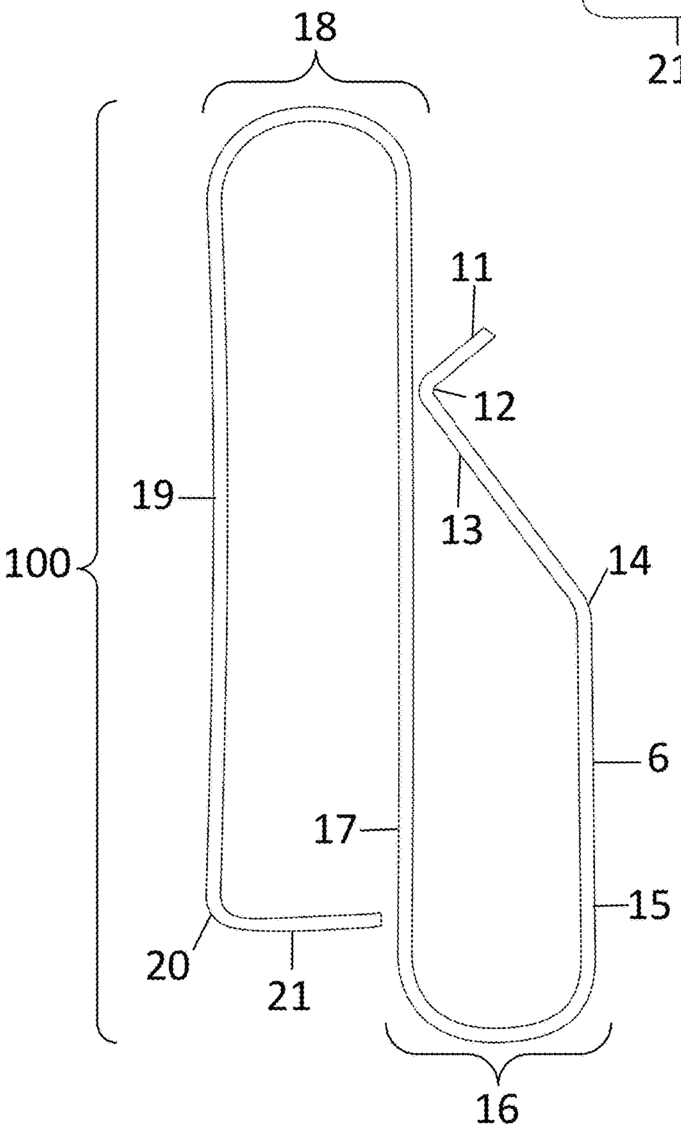
FIG. 2 is a front elevation view of the bottle opening device of FIG. 1.

FIG. 2 is a front elevation view of the bottle opening device of FIG. 1. The disclosed technology may be also be described as continuous bent wire 100 comprising a first segment 21 at a right angle 20 to a second segment 19, the second segment 19 ending at a first 180-degree curve 18, a third segment 17 extending from this first curve 18 to a second 180-degree curve 16, and a fourth segment 15 beginning at the second 180-degree curve 16 and ending at an obtuse angle 14 in the wire 100 bent towards the third segment 17. The wire 100 may further include a fifth segment 13 between the obtuse angle 14 and a right angle bend 12, with a sixth segment 11 connected to the right angle bend 12. The first segment 21 may terminate the wire 100 at a first terminus and the sixth segment 11 may terminate the wire 100 at a second terminus. In some embodiments, the distance between the curve 16 and the first segment 21 is less than or equal to 6.35 millimeters inch in order to properly fit onto a bottle with an opening of 28 millimeters found on many bottles, such as standard water bottles known in the art. Note also that the radius of the edge 22 is 12.7 mm in embodiments of the disclosed technology. This allows the retention ring to be captured by way of the interior bend of the end edge 22 due to the edges being smaller than a full length of a comparatively flat edge, allowing for easier insertion within a ring 36.

The second, third, and fourth segments (19, 17, and 15, respectively) may be parallel to each other, and the first and second 180-degree curves (18 and 16, respectively) can be identical in size and flipped 180 degrees relative to each other, both facing towards the center of the contiguous bent wire 100. In some embodiments, the first segment 21 terminates at the end of the wire 100, adjacent to the third segment 17, with the obtuse angle 14 bent from the fourth segment 15 towards the third segment 17. The right angle bend 12 may be adjacent to the third segment 17.

Figure 3:
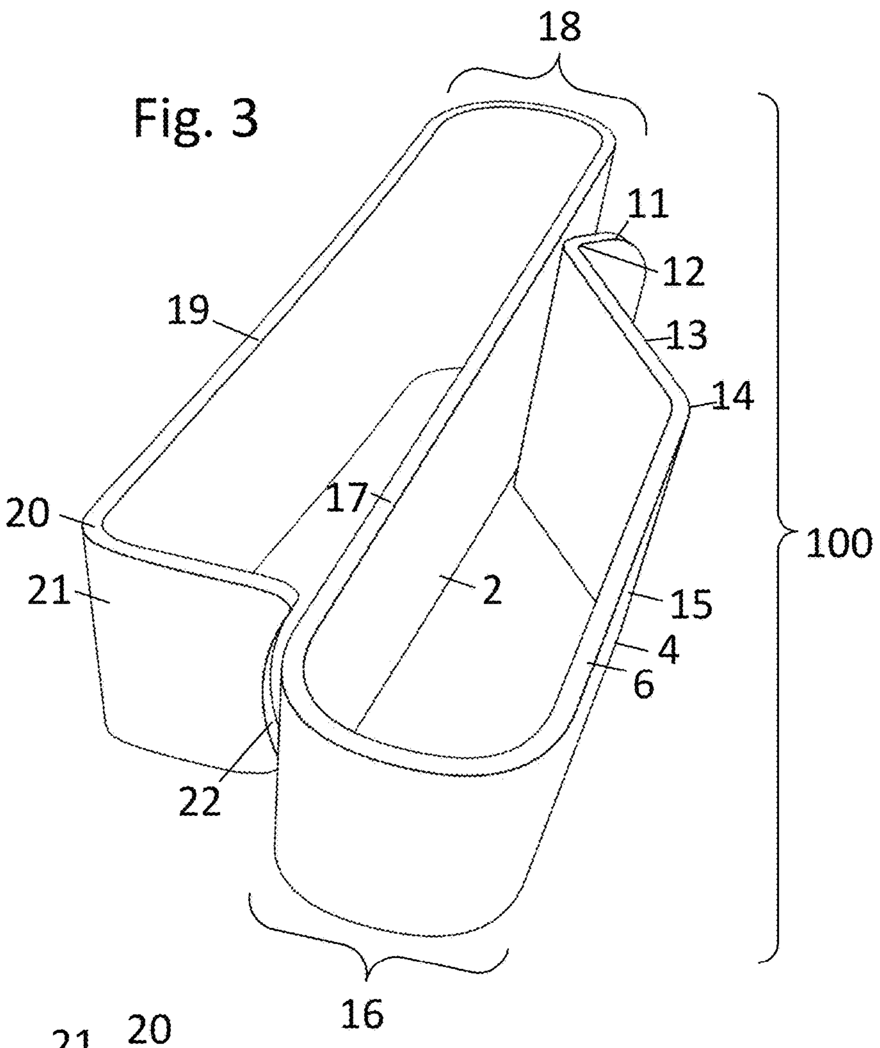
FIG. 3 is a top, front, and side perspective view of the bottle opening device of FIG. 1.

FIG. 3 is a top, front, and side perspective view of the bottle opening device of FIG. 1. The bottle opening device 100, as shown, has a first set of faces which are narrow edges. The first face 6 and second face 8 (see FIG. 4) are congruent and parallel, "congruent" defined as "equal in substantially every, or every angle and dimension". The bottle opening device may have a largest cross-sectional area along a height that is less than 5% larger than the smallest cross-sectional area along the height. The height is a shortest linear length spanning between the first face 6 of the first set of faces and the second face 8 of the first set of faces. The cross-sectional areas are two dimensional regions that are bound by edges 2, 4, 10 (see FIG. 4), and 22 and that are parallel to the first 6 and second 8 faces of the first set of faces. Each cross-sectional area intersects a two dimension line of height between the first 6 and second 8 faces of the first set of faces once. Variation in cross sectional areas arises due to the curvature of edge 22, which may be adapted to the curvature of an upper region of a bottle such as the spout.

A second set of faces (2 and 4) may span the distance between and connect the first set of faces (6 and 8). The second set of faces can form right angles with the first set of faces at connecting edges, making the device 100, excluding segment 21 with curvilinear edge 22, a right prism-a prism where the sides (lateral faces 2 and 4) are perpendicular to the bases (6 and 8). In embodiments where the second set of faces do not form right angles with respect to the first set of faces, however, the device 100, excluding segment 21 with curvilinear edge 22, may constitute an oblique prism.

Figure 4:
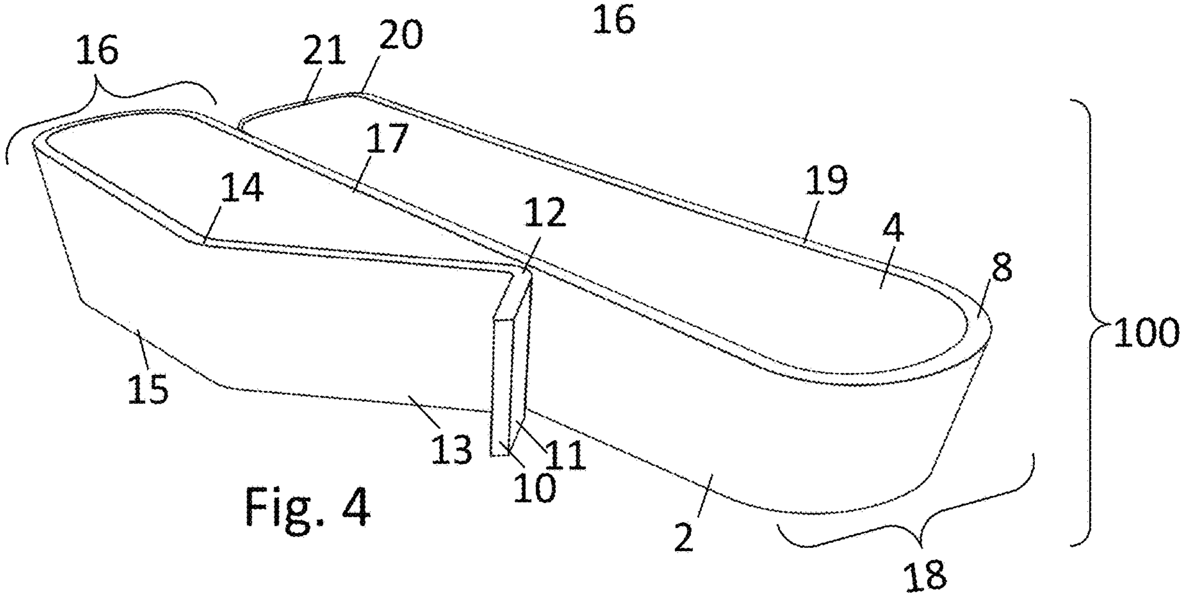
FIG. 4 is a back, side, and bottom perspective view of the bottle opening device of FIG. 1.

FIG. 4 is a back, side, and bottom perspective view of the bottle opening device of FIG. 1. The back side 8 is a mirror image of the front side 6. Disposed at a terminus of the device 100 and, more specifically, at an end of the sixth segment 11 is an edge 10, which may be perpendicularly disposed with respect to faces 6 and 8.

Figure 5B:
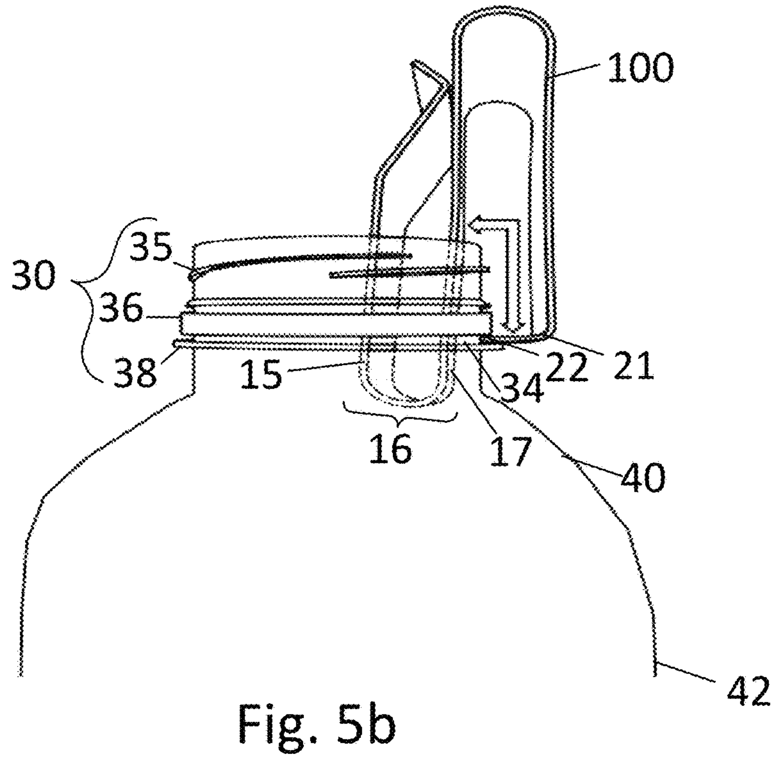
Figure 5A:
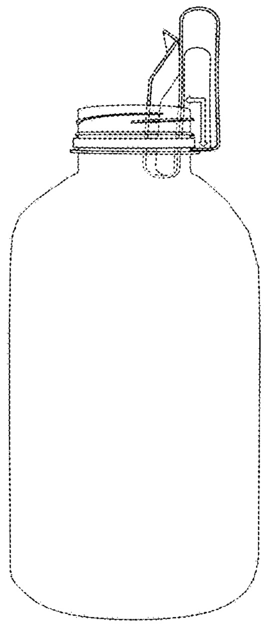

FIG. 5*a* is a perspective view of the bottle opening device of FIG. 1 being placed into a bottle 42. FIG. 5*b* is an enlarged view of an upper portion of FIG. 5*a*. A concavely curved upper region 40 tapers a diameter of the bottle to a comparatively smaller diameter of a spout/neck 30 with a circumference 62 (see FIG. 7*b*) circumscribing an interior portal. Disposed along the neck 30 are a lip 38, a tamper-evident band 36, and a helically wrapped incline plane 35 along which a bottle cap is rotated for securement and release. The tamper-evident band ensures product integrity by allowing consumers to easily identify if a bottle has been opened before purchase, thus preventing unauthorized refilling or contamination of the internal contents. The band is connected to the cap by thin bridges of a material such as plastic or metal, which, when the cap is for the first time twisted off the bottle, break, separating the band from the cap. The band 36 often remains on the neck 30 even after the cap is removed.

A top region of the opener 100 comprising curve 16 and portions midsegments 15 and 17 is lowered into the bottle 42. Curvilinear edge 22 is abutted against the neck 30 of the bottle 42 between the lip 38 and the tamper-evident band 36, the curvilinear edge 22 adapted to fit around the neck 30. The steps of lowering the top region into the bottle 42 and abutting the curvilinear edge 22 thereagainst may occur in any order or even simultaneously. Arrow 51 is representative of the lowering of the device 100 and the abutment of the device 100 against the neck 30.

FIG. 6*a* is a perspective of the bottle opening device of FIG. 1 being slid under the tamper-evident band 36 of the bottle 42. FIG. 6*b* is an enlarged view of an upper portion of FIG. 6*a*. The bottle opening device 100 is pivoted away from the center of the neck 30, curve 16 is lifted out of the interior of the bottle 42, and curve 18 arcs towards the ground. The center of rotation for this motion 53 is located at a point between the neck 30 and angle 20, inclusive of the aforementioned endpoints. The exact center of rotation may change as the rotation is executed and the device 100 is further moved. The motion 53 reorients the curvilinear edge 22 such that the curvilinear edge 22 is aligned parallel to the neck 30, at which point a user of the device 100 executing the rotation 53 slides segment 21 upwards such that the tamper-evident band abuts the device 100 at angle 20.

FIG. 7*a* is a perspective view of the bottle opening device of FIG. 1 secured to a water bottle. FIG. 7*b* is an enlarged view of an upper portion of FIG. 6*a*. When the device is oriented as shown in FIG. 6*a* and FIG. 6*b*, upwardly moving the device 100 by applying force such as pulling upwards on curve 16, pushing upwards on curve 18, and/or applying upwards force to other components of the device 100 induces the device 100 to assume the orientation shown in FIG. 7*a* and FIG. 7*b*; midsegment 19 is slid between the tamper-evident band 36 and the neck 30 until the device 100 abuts the band 36 at a region 61 at an end of midsegment 19 distal to segment 21. The band 36 may frictionally secure the device 100 in place. The variety of loops, portals, and components of the device 100 provide a multitude of regions which a user of the device may grasp and to which the user may apply forces to effectuate the intended operation of the device 100. Whilst oriented as shown in FIG. 7*a* and FIG. 7*b* a hook, cord, or the like may be looped underneath curve 16, thereby conveniently connecting the device thereto. The device 100 thus may constitute an efficient mechanism to attach bottles to backpacks and/or other items for easy transport.

FIG. 9 is a perspective view of the bottle opening device of FIG. 1 secured to a band 46 of a bottle. The method of securing the device 100 to the band is the same as the previously described method of doing so. In the embodiment of FIG. 9, band 46 is an elastic band placed around the neck of the bottle by a user of the device. The functionality of the device 100 when used in conjunction with a tamper-evident band may be the same as the functionality of the device 100 when used in conjunction with such a user-placed band 46. Band 46 thus enables the device 100 to facilitate easy carrying and transporting of bottles with caps (such as cap 44) lacking a tamper-evident band.

FIG. 8 is a perspective view of the bottle opening device of FIG. 1 removing a bottle cap 44. The curvilinear edge 22 is upwardly inserted between a bottle top 45 and cap 44 and curve 18 is arced away from the cap 44 while curve 16 abuts or remains adjacent to the cap 44. Pressing downwards on at least one component of the device 100 to effectuate the described arcing 54 pries off the cap 44 from the bottle. The second angular segment 21 may be used as a fulcrum against the bottle top 45 during the rotation 54 of the device 100 while prying off the cap 44, thus targeting force against the bottle cap 44.

It should be understood that, for purposes of this disclosure, deviation of less than 5% from a directional and/or angular description is considered to be included therewithin. For example, an angle of 89 degrees is still considered to be a right angle.

Any device or step to a method described in this disclosure can comprise or consist of that which it is a part of, or the parts which make up the device or step. The term "and/or" is inclusive of the items which it joins linguistically and each item by itself.

For the purpose of this disclosure, the term "Substantially" is defined as "at least 95% of" the term being described" which it modifies, i.e. within the range of 95% to 100% of the term being modified, inclusive.

Any device or aspect of a device or method described herein can be read as "comprising" or "consisting" thereof.

When the term "or" is used, it creates a group which has within either term being connected by the conjunction as well as both terms being connected by the conjunction.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within understood that the phraseology or the terminology employed herein is for description and not of limitation. Therefore, while the embodiments herein have been described in terms of preferred embodiments, those skilled in the art will recognize that the embodiments herein can be practiced with modification within the spirit and scope of the appended claims.

I claim:

1. A bottle opening device, comprising a single continuous length of material, defining:

first, second, and third midsegments, each extending linearly;

a first concave bend disposed between the first midsegment and the second midsegment;

a second concave bend disposed between the second midsegment and the third midsegment;

a first angular end segment disposed at an end of the first midsegment and extending toward the second midsegment; and a second angular segment disposed at an end of the third midsegment and extending toward the second midsegment, wherein the first concave bend and the second concave bend define opposing ends of the bottle opening device.

2. The bottle opening device of claim 1, wherein the first, second, and third midsegments are parallel to one another.

3. The bottle opening device of claim 1, wherein a first line of tangency to a lateral midpoint of the first concave bend is parallel to a second line of tangency to a lateral midpoint of the second concave bend.

4. The bottle opening device of claim 3, wherein:

a largest face of the second angular segment forms a right angle with respect to the third midsegment; and the second angular segment is parallel to the second line of tangency and is disposed between the first line of tangency and the second line of tangency.

5. The bottle opening device of claim 3, wherein a length of the bottle opening device is equal to a distance between the first line of tangency and the second line of tangency.

6. The bottle opening device of claim 1, the single continuous length of material further defining a first set of faces wherein a first face of said first set of faces and a second face of said first set of faces are congruent and parallel to one another.

7. The bottle opening device of claim 6, the single continuous length of material further defining a second set of faces, wherein a first face of the second set of faces and a second face of the second set of faces span a distance between, and connect, the first face of the first set of faces to the second face of the first set of faces.

8. The bottle opening device of claim 7, wherein the second set of faces form a plurality of right angles with respect to the first set of faces at edges where the first and second sets of faces connect.

9. The bottle opening device of claim 6, wherein the second angular segment terminates in a concave curvilinear edge, the concave curvilinear edge extending between the first and the second face of the first set of faces.

10. The bottle opening device of claim 9, wherein the first angular segment includes:

a first subsegment forming an obtuse angle with the first midsegment; and a second subsegment, extending from an end of the first subsegment distal to the first midsegment, the second subsegment forming a right angle with the first subsegment.

11. A method of carrying out or instructing one to carry out using the bottle opening device of claim 10, comprising steps of, in order:

upwardly inserting the concave curvilinear edge between the bottle top and a bottle cap;

pressing downwards on at least one component of the bottle opening device; and prying off a cap sealed atop the bottle.

12. A method of carrying out or instructing one to carry out using the bottle opening device of claim 11, further comprising a step of:

using the second angular segment as a fulcrum against a top of the bottle in order to pry off the cap.

13. A method of carrying out or instructing one to carry out using the bottle opening device of claim 10, comprising steps of, in order:

abutting the concave curvilinear edge against a top of a bottle and beneath a tamper-evident band;

lowering the first concave bend into the bottle;

tilting the second concave curvilinear edge downwards and away from the top of the bottle; and sliding the second angular segment and the third midsegment through a space between the tamper-evident band and the top of the bottle.

14. A method of carrying out or instructing one to carry out using the bottle opening device of claim 13, further comprising a step of:

looping an attachment mechanism beneath said first concave bend connecting said bottle opening device to said attachment mechanism.

15. The bottle opening device of claim 1, wherein the second angular segment forms a right angle to the second midsegment.

16. The bottle opening device of claim 1, wherein the second angular segment is disposed between the first concave bend and the second concave bend.

17. The bottle opening device of claim 1, further comprising an end segment, extending from an end of the first angular segment and away from the second midsegment, such that the end segment forms a right angle with respect to the first angular segment.

18. The bottle opening device of claim 1, wherein the second midsegment is longer than each of the first midsegment and the third midsegment.

* * * * *